United States Patent [19]
Tallis, Jr. et al.
[11] Patent Number: 4,695,735
[45] Date of Patent: Sep. 22, 1987

[54] ENGINE STARTER DRIVE WITH INTEGRAL STARTER RELAY

[75] Inventors: John R. Tallis, Jr., Horseheads; Nicholas A. Volino, Elmira, both of N.Y.

[73] Assignee: Facet Enterprises, Inc., Tulsa, Okla.

[21] Appl. No.: 868,448

[22] Filed: May 30, 1986

[51] Int. Cl.[4] ........................ F02N 11/00; H02P 9/00; H02K 1/06

[52] U.S. Cl. .................................. 290/38 R; 290/48; 123/179 M; 74/7 R; 74/7 C

[58] Field of Search ................ 290/38 R, 38 A, 38 C, 290/48, DIG. 1; 74/7 R, 7 C, 6, 7 A; 123/179 M; 310/75 R, 75 C, 78

[56] References Cited

U.S. PATENT DOCUMENTS

| | | | |
|---|---|---|---|
| 2,939,324 | 6/1960 | Gilbert et al. | 74/7 C |
| 3,124,694 | 3/1964 | Seilly | 290/38 |
| 3,177,368 | 4/1965 | Seilly | 290/38 |
| 3,210,554 | 10/1965 | Seilly et al. | 290/38 |
| 3,465,353 | 9/1969 | Buxton et al. | 74/7 |
| 4,156,817 | 5/1979 | Preece et al. | 290/38 R |
| 4,327,300 | 4/1982 | Hoven | 74/7 C X |
| 4,366,385 | 12/1982 | Williams | 290/38 R |
| 4,464,576 | 8/1984 | Williams | 290/38 R |

*Primary Examiner*—William M. Shoop, Jr.
*Assistant Examiner*—Sharon D. Logan
*Attorney, Agent, or Firm*—Remy J. VanOphem

[57] ABSTRACT

A starter drive for an internal combustion engine in which the starter drive is mounted within the starter housing, and an ignition key activated solenoid for energizing the motor of the starter drive is contained in a solenoid housing that is attached to the starter housing and is integral therewith. The solenoid has a solenoid coil and an annular armature, and upon the energization of the solenoid coil by the connection of such solenoid coil to the battery through the ignition key, the annular armature, which is normally spring biased away from the solenoid coil, is magnetically attracted thereto. This movement of the annular armature establishes an electrical contact between a first terminal, which is connected to the battery, and a second contact which is connected to the starter motor. Release of the ignition key from the "start" position breaks the electrical contact between the solenoid coil and the battery, and the annular armature is then biased away from the solenoid coil by the spring, breaking the electrical contact between the battery and the starter motor.

10 Claims, 11 Drawing Figures

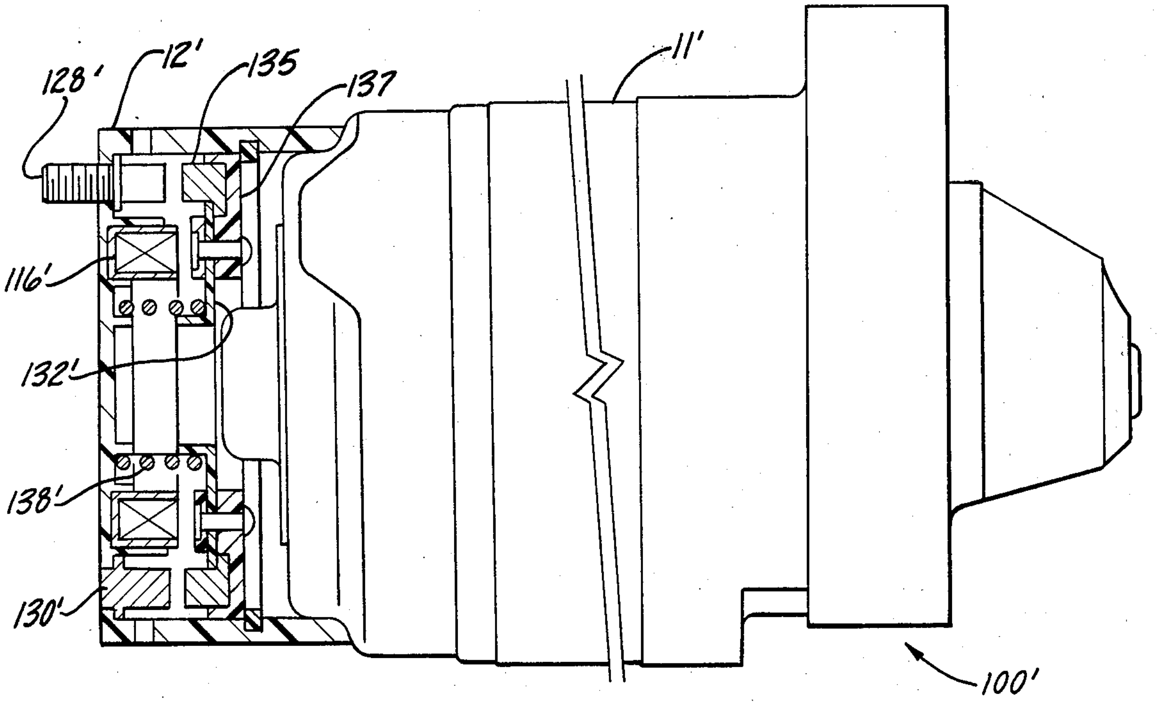
Fig-10
Fig-11
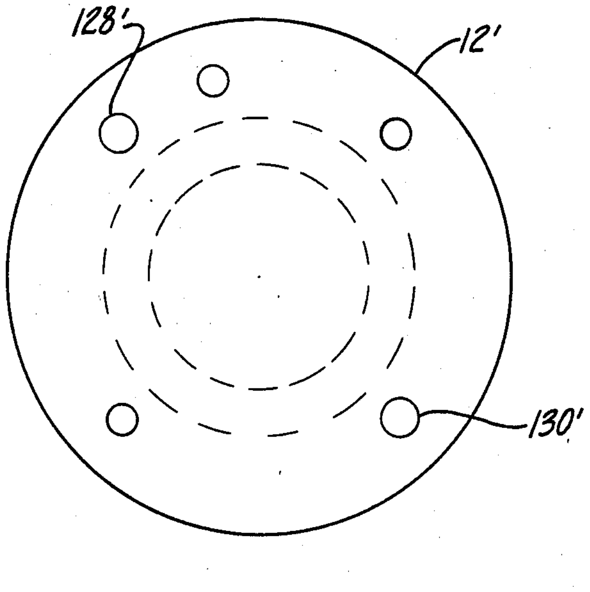

ENGINE STARTER DRIVE WITH INTEGRAL STARTER RELAY

BACKGROUND OF THE INVENTION

1. Field of the Invention

The present invention relates to an engine starter drive for an internal combustion engine and, more particularly, to an engine starter drive for a starter of the positive shift type wherein the starter motor pinion travels under inertia to engage the flywheel ring gear of the engine to be started, such a starter having a solenoid at one end of the housing of the starter to energize the starter motor.

2. Description of the Prior Art

Heretofore, co-axial solenoid type starter motors which utilize a solenoid to advance a shaft with a drive pinion have been known in the art. U.S. Pat. No. 3,210,554 (A. H. Seilly, et al) shows the use of a solenoid to attract an armature to overcome the force of the spring and move a sleeve forwardly by an amount sufficient to engage the teeth of a pinion with the teeth of a flywheel. When the armature has completed its travel a switch is closed to start the motor. When the pinion is fully engaged with the flywheel, catch balls move into recesses and are held therein by a collar. When the engine is started, the remotely disposed switch is opened and the armature returns to its original position under the action of the spring.

U.S. Pat. No. 3,124,694 (A. H. Seilly) shows a starting mechanism with an axially movable core to impart initial axial movement to the shiftable drive portion. U.S. Pat. No. 3,177,368 (A. H. Seilly) discloses an engine starting mechanism with internal switching so that if the starter switch is held closed after the engine has started, when the speed of the motor exceeds a predetermined value, a resilient member will overcome the action of the solenoid winding so that the pinion is withdrawn from engagment with the ring gear and the motor switch is opened to break the circuit to the motor. U.S. Pat. No. 4,156,817 (K. Preece, et al) shows a starter motor arrangement which utilizes a two-stage starter arrangement to insure clearance of a tooth abutment prior to the engagement of the starter motor.

It is also known to utilize a starter drive which advances the drive pinion on helical splines by inertia developed by the motor. U.S. Pat. No. 3,465,353 (Buxton, et al) discloses a starter drive mounted on a motor drive helical screw shaft to advance the drive pinion. A resilient or spring loaded friction connection with the housing provides a force component axially translating the drive of the screw shaft into a cranking position whereby it engages an engine flywheel. After permanent ignition has occurred and the ignition switch has been released, voltage is applied to an electromagnet to close a switch and short circuit the armature, an action which causes a powerful braking effect to be applied to the starting motor. This braking effect quickly and sharply disengages the shiftable portion of the starter drive. U.S. Pat. No. 4,366,385 (J. O. Williams), which is owned by the Assignee of the present application, shows an engine starter drive in which a screw sleeve mechanism cooperatively engages a helical thread portion on a motor driven shaft. A ring armature member is centrally disposed relative to the screw sleeve mechanism and is connected to the screw sleeve mechanism. When the screw mechanism and the drive pinion are advanced by inertia, a ring armature mechanism is engaged by an engaging member such that the drive member is held in mesh with the engine ring gear and the motor torque is transmitted to the ring gear until the motor is deactivated. However, the starter motor of Williams requires an external solenoid or switch to initiate operation of the starter motor. This requires additional wiring and parts, thereby causing added expense.

SUMMARY OF THE INVENTION

The present invention is directed to an improved starter drive which advances the drive pinion on helical splines without rotation, by inertia, to engage the engine ring gear. The starter drive motor is energized by a solenoid mounted at the end of the housing opposite the drive pinion, and the drive pinion is held in engagement with the engine ring gear by an engaging mechanism which allows total motor torque to be transmitted to the ring gear until the motor is deactivated.

The present invention provides a starter drive for internal combustion engines having a starter drive housing, a motor driven shaft having a cylindrical end portion, a helical threaded portion between the cylindrical end portion and the motor, and a solenoid which is positioned at an end of the housing opposite the cylindrical end portion of the motor driven shaft. The starter has a starting motor relay or solenoid which is integrally mounted to the starter as a unit, rather than being installed at a remote location as in the case of the prior art, thereby simplifying the installation of the various components of the starter system and any subsequent servicing thereof, including the elimination of some of the wiring materials used in the installation of the prior art starter system.

It is, therefore, a primary object of this invention to provide an improvement to a starter drive which advances the drive pinion on helical splines without rotation, by inertia, the improvement being an integral energizing solenoid operable to energize the motor.

It is another object of the present invention to provide a starter solenoid which may be mounted to an end of a housing, which may be simply and easily attached. It is yet another object of the present invention to provide a starter solenoid having a ring armature which moves axially along the drive shaft.

Other objects and advantages of the invention will become apparent upon reading the following detailed description with reference to the drawings.

BRIEF DESCRIPTION OF THE DRAWINGS

FIG. 10 is an elevational view, partly in section, of an alternate embodiment of a starter drive according to the present invention in the deenergized position; and FIG. 11 is an end view of the starter solenoid of FIG. 10.

DETAILED DESCRIPTION OF THE PREFERRED EMBODIMENT

Figure 6:
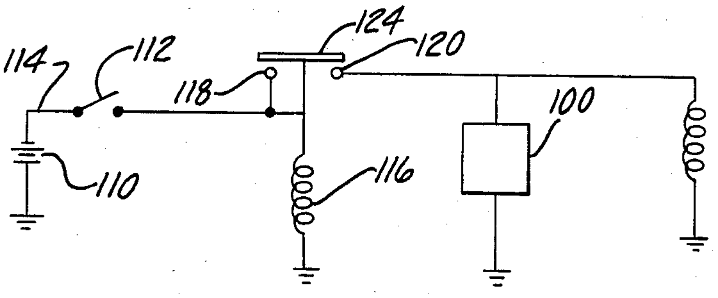
FIG. 6 is a schematic view of an electrical starting circuit for a starter according to the present invention.
Figure 7:
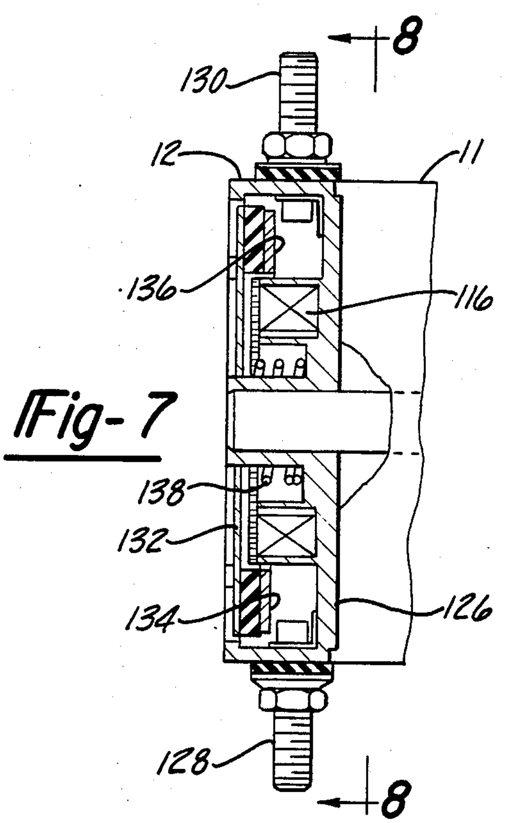
FIG. 7 is an elevational view of a preferred embodiment of a starter solenoid, partially in section, with the solenoid in the open position.
Figure 8:
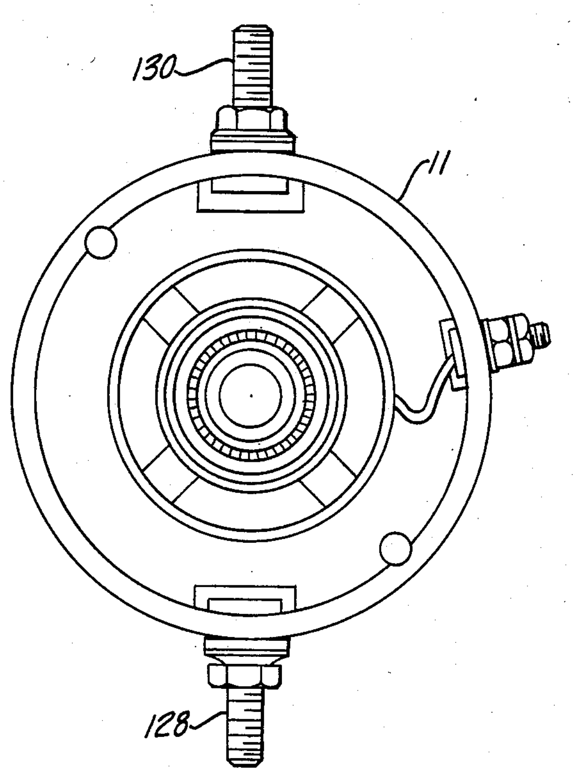
FIG. 8 is a sectional view of the starter taken along lines 8—8 in FIG. 7.
Figure 9:
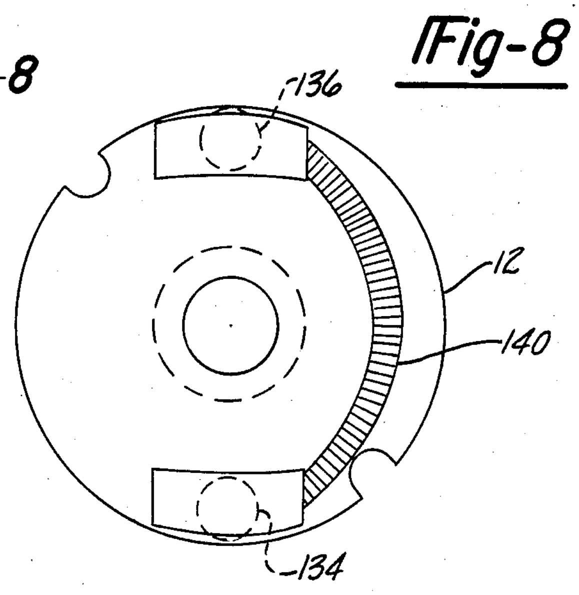
FIG. 9 is a front view of the ring armature member.

Referring to FIG. 6, the invention is shown in connection with the starting circuit for a conventional automobile engine. A battery 110 is connected at one end to ground. A starter switch 112 is connected at one end by a cable 114 to a second end of the battery. The starter switch 112 is connected at another end to a solenoid coil 116 at a first terminal 118. A second terminal 120 is connected to the armature of a starter drive 100. The starting circuit is completed by connecting both the solenoid coil 116 and the armature of the starter drive 100 to ground. When the starter switch 112 is closed, i.e. when it is moved to its "start position, the solenoid coil 116 is energized to draw a ring armature 124 into contact with the first terminal 118 and the second terminal 120, thereby closing the circuit from the battery 110 to the motor of the starter drive 100.

Figure 1:
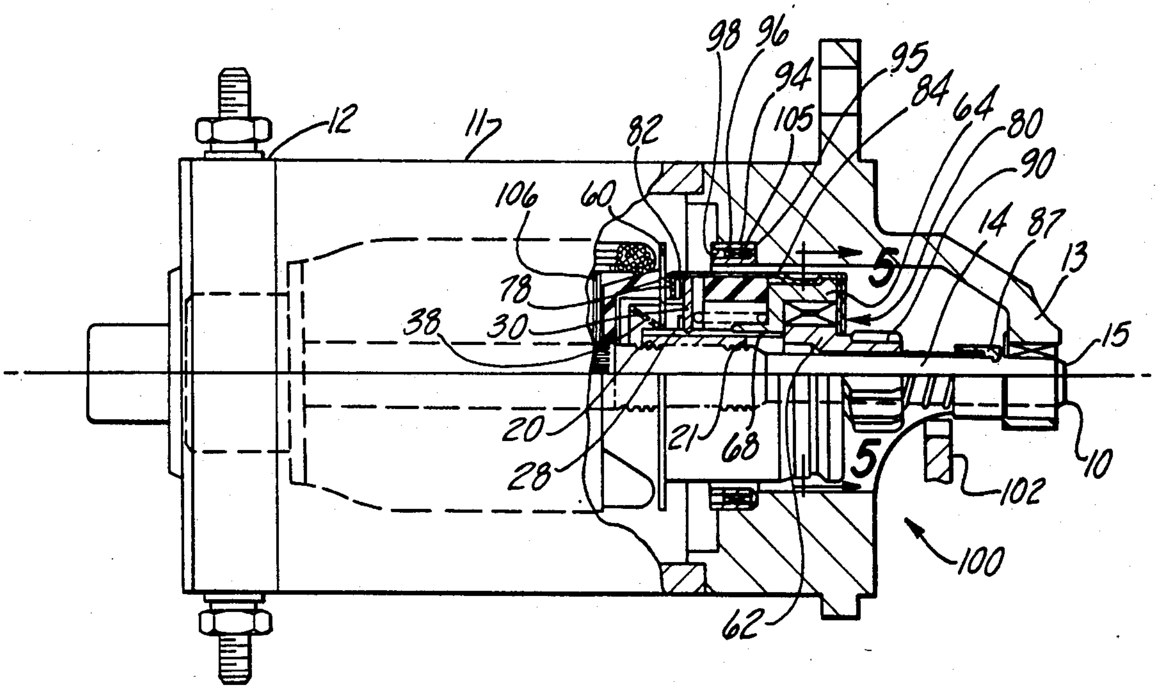
FIG. 1 is an elevational view, partly in section, of the preferred embodiment of the starter drive according to the invention in the deenergized position.

As is shown in FIGS. 1 through 5, the starter drive 100 is mounted on a drive shaft 10 which is rotatably mounted in the starter motor housing 11 which extends from a solenoid housing 12 to the motor housing 13. The drive shaft 10 futher has a diametral or first cylindrical portion 14 adjacent to one end 15 thereof. The drive shaft 10 has an axial advancing member in the form of helical splines 16 formed on a second cylindrical portion 18 which extends between the first cylindrical portion 14 and an electric motor armature 106 as is shown in FIG. 1.

The starter drive 100 engages a ring gear 102 from the internal combustion engine (not shown) to be started. The starter drive 100 includes a screw sleeve 39, and the screw sleeve 39 has an axially extending sleeve member 20 which is connected to the drive shaft 10 by a mutually engagable helical spline connection 22 on its inner diameter. Thus, the axially extending sleeve member 20 is slidably and rotatably advanced along the drive shaft 10 by virtue of the mutually engaging helical splines 16 and 22 when the drive shaft 10 rotates. The axially extending sleeve member 20 has an outer diameter 24 which has straight splines 28 formed thereon. An annular ring member 30 is mounted on the straight splines 28. A ring armature 60 includes a washer member 40 and a second annular ring member 50. A helical conical spring member 38 is trapped between a radially extending end portion 48 of the washer member 40 and the second annular ring member 50 and biases the second annular ring member 50 towards an end portion 42 of the washer member 40.

Figure 3:
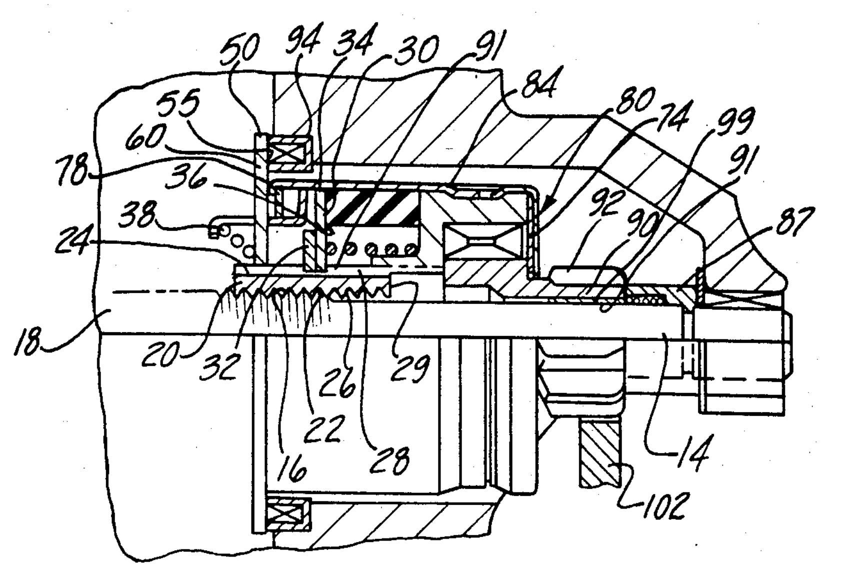
FIG. 3 is a view similar to FIG. 2 showing the starter drive in the cranking position.
Figure 4:
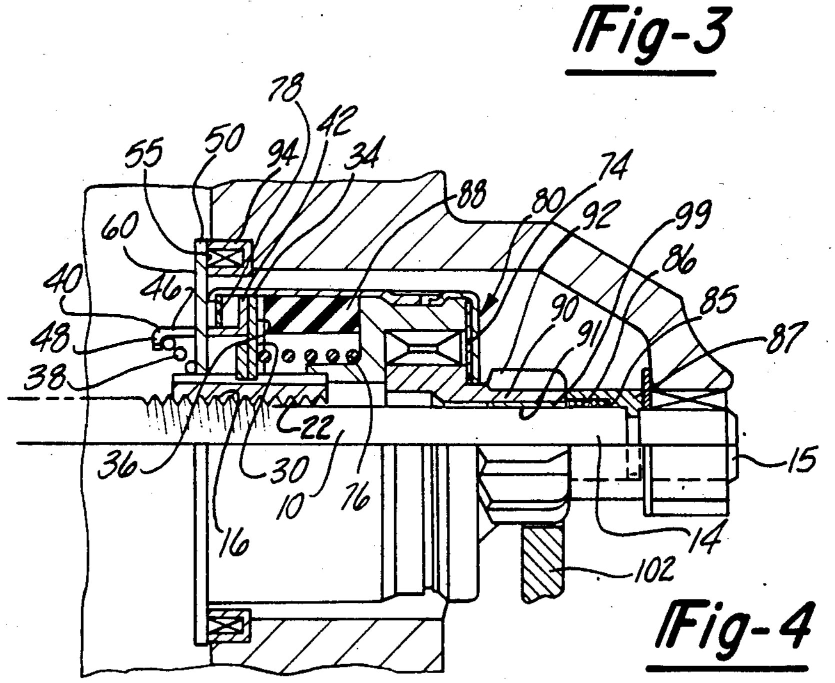
FIG. 4 is a view similar to FIG. 2 showing the starter drive in the overrun condition.
Figure 5:
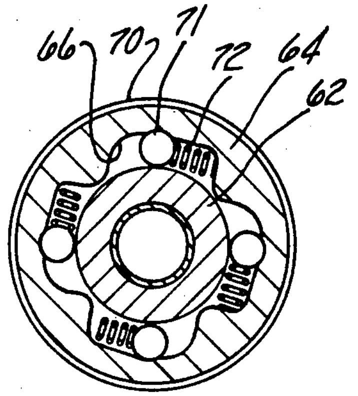
FIG. 5 is a sectional view taken on line 5—5 of FIG. 1.

A pinion gear 90 is slidably mounted on the first cylindrical portion 14 of the drive shaft 10, a bearing 99 being positioned between the pinion gear 90 and the drive shaft 10. The pinion gear 90 has a plurality of teeth 92 formed thereon which are adapted for movement into and out of engagement with the ring gear 102 of the internal combustion engine (not shown) to be started. A unidirectional clutch mechanism 80 includes a unidirectional roll clutch 70, a case member 84 which is in the shape of a cup, a second retaining ring member or abutment member 78, a resilient member 88 and a second biasing member 76. The pinion gear 90 is connected to the inner race 62 of the unidirectional roll clutch 70. The inner race 62 is mounted to the outer race 64 of the unidirectional roll clutch 70. The outer race 64 is coupled by splines 68 which cooperatively engage the straight splines 28 of the axially extending sleeve member 20 near end 29 thereof. The outer race 64 has a plurality of cam surfaces 66 formed therein, as shown in FIG. 5. A roller spring 72 and a roller 71 are inserted into each of the cavities formed by the cam surfaces 66 between the inner and outer races. The rollers 71 and their respective springs 72 are retained in their respective cavities by a pair of half washers 74 as shown in FIG. 3. The rollers 71, springs 72 and half washers 74 are contained between the inner and outer races by the case member 84. The case member 84 is mounted onto the outer diameter of the outer race 64 and extends radially inward at one end toward the inner race 62. The case member 84 extends from the outer race 64 longitudinally along the axis of the drive shaft 10 along the electric motor armature 106 and terminates between the second retaining ring 78 and a radial face 55 of the ring armature 60. A groove 82 is formed in the case member 84 for a purpose to be described herein later. When the drive shaft 10 rotates, the torque therefrom is transmitted from the drive shaft through the helical splines 16 and straight splines 28 to the outer race 64, and the rollers 71 are wedged against the cam surfaces 66 by the roller springs 72 to prevent relative movement between the outer race 64 and the inner race 62, to thereby transmit torque to the pinion gear 90. When the engine begins to overrun the speed of the drive shaft, the engine ring gear 102 drives the pinion gear 90 faster than the drive shaft 10 is rotating. As this occurs the inner race 62 urges the roller 71 against the roller spring 72 away from the cam surface 66. Thus, the pinion gear 90 and the inner race 62 can overrun relative to the other members of the starter drive 100.

Figure 2:
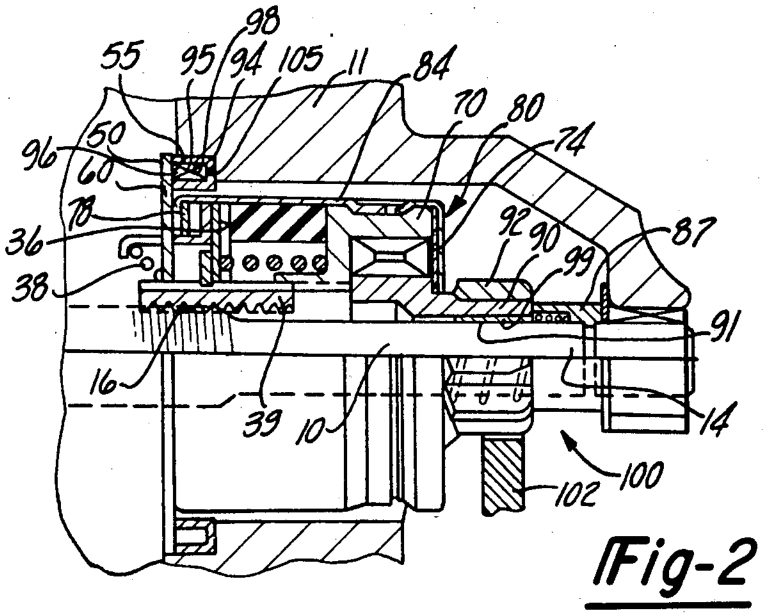
FIG. 2 is a fragmentary elevational view, partly in section and at an enlarged scale relative to that of FIG. 1, of the starter drive of FIG. 1 in the energized position.

The case member 84 confines the first annular ring member 30 as well as one end portion 42 of the washer member 40 in the cavity, defined by the case member 84, by means of the abutment member 78 inserted in the groove 82. The first annular ring member 30 and the one end portion 42 of the washer member 40 are, thus, free to move axially within the case member 84 toward the pinion gear 90, but are prevented from moving axially towards the electric motor armature beyond the groove 82 by the abutment member 78 as well as a retaining ring 32. The resilient member 88 is pendantly mounted to the outer race 64 and the first annular ring member 30 so as to be within the case member 84. The second biasing member 76, preferably a helical spring member, is arranged in the case member 84 to extend between the outer race 64 and the first annular ring member 30. Thus, the second biasing member 76 biases the outer race 64 away from the first annular ring member 30, along the mating splines 68 in a direction of maximum extension relative to the axially extending sleeve member 20. The second biasing member 76 thereby provides a gap between the abutment member 78 and the first annular ring member 30 on the axially extending sleeve member 20, as shown in Figure 2. In other words, the spring force established by the second biasing member 76 is higher than the force of the helical conical spring 38 to provide a gap.

The starter drive 100 has an opening element 94 which includes a fixed or stationary megnet body 95 adapted to be secured in a cavity 105 of the starter motor housing 11. The magnet body 95 is fabricated of magnetic flux conducting material, such as iron or steel. The magnet body 95 is formed to provide an annular recess or cavity 98 in which is mounted an electromagnetic coil 96. The electromagnetic coil 96 may be secured in the cavity 98 by use of a resin or other well known conventional means. The electromagnetic coil 96 has a set of leads (not shown), one of which is connected to the second terminal 120 and the other which is connected to ground. The magnet body 95 is mounted within the starter motor housing 11 such that when the pinion gear 90, the unidirectional clutch mechanism 80, the ring armature 60, and the screw sleeve 39 are translated axially along the helical splines to engage the engine ring gear 102, by the inertia which results from the rotation of the drive shaft 10, the radial face 55 of the second annular ring member 50 which extends radially above the case member 84 will be engaged by the magnet body 95 when the electromagnetic coil 96 is energized. When electrical power is applied through the second terminal 120 and lead to the electromagnetic coil 96, a magnetic field is generated. The magnetic field is sufficient to pull the starter drive 100 along the drive shaft. The electromagnetic coil, by way of nonlimiting example only, draws about one-half ampere of current.

When the radial face 55 of the second annular ring member 50 contacts the magnet body 95, the flux path generated by the magnetic field travels in a loop through the magnet body 95 through the second annular ring member 50 and returns back to the magnet body 95. The magnetic flux, thus, keeps the second annular ring member 50 in engagement with the magnet body 95 and, thus, provides a closed contact between the pole faces of the magnet body and the second annular member. In doing so, the magnet body 95 clamps the radial face 55 of the second annular ring member 50 thereby preventing the second annular ring member from rotating with the screw sleeve 39. A stop member 87 is positioned on the first cylindrical portion 14 of the drive shaft 10 adjacent the end thereof to limit the axial travel of the pinion gear 90 along the drive shaft toward the motor housing 13. The stop member 87 further has a counterbore 85 formed therein to permit placing an antidrift biasing spring 86 around the drive shaft 10 and into the counterbore 85. The antidrift biasing spring 86 extends from the pinion gear 90 to the stop member 87. As the pinion gear 90 moves axially to engage the ring gear, the antidrift biasing spring 86 compresses and fits within the counterbore 85 and the stop member 87. When the motor is deenergized, the antidrift biasing spring 86 prevents the pinion gear 90 from moving along the drive shaft contacting the engine ring gear.

The electric motor armature 106 of the starter drive 100 is energized, as heretofore explained, by the energization of the solenoid coil 116 which is contained within the solenoid housing 12, the solenoid housing being integrally attached to the starter motor housing 11 to simplify the installation and servicing of a starter system and to eliminate the extra wiring and related equipment that is required when the starter solenoid is installed at a remote location on the vehicle. The solenoid coil 116 is contained within a cavity in the solenoid housing 12, on the opposite side of an end plate 126 of the starter motor. Voltage from the battery 110 is applied to a first terminal contact 128. A second terminal contact 130 is connected to the field windings of the motor of the starter drive 100. When the solenoid coil 116 is energized by the starter switch 112, a steel contact plate 132 that carries first and second copper contacts 134 and 136 is drawn toward the solenoid coil 116 by the magnetic attraction therefrom, overcoming the force of a spring 138 that normally biases the steel contact plate 132 away from the solenoid coil 116. The movement of the steel contact palte 132 toward the solenoid coil 116, as heretofore explained, brings the first and second copper contacts 134 and 136 into contact with the first and second terminal contacts 128 and 130, respectively.

The first and second copper contacts 134 and 136 are connected to one another by an insulated braided copper wire 140, and when the first and second copper contacts 134 and 136 make contact with the first and seond terminal contacts 128 and 130, respectively, the voltage from the battery 110 that is applied to the first terminal contact 128 will be passed to the starter motor of the starter drive 100 through the second terminal contact 130. The starter motor will remain energized so long as the starter switch 112 is maintained in its "start" position, and when the starter switch 112 is released from its "start" position, the solenoid coil 116 is deenergized allowing the force from the spring 138 to return the steel contact plate 132 to its original position, thus, breaking the connection between the first terminal contact 128 and the second terminal contact 130 and deenergizing the starter motor of the starter drive 100.

In the embodiment of the invention illustrated in FIGS. 10 and 12, there is illustrated a starter drive 100' which is generally similar to the starter drive 100 of the embodiment of FIG. 1, except as is hereinafter described. The starter drive 100' has a starter motor housing 11' which has a starter solenoid housing 12' attached thereto.

An electromagnetic solenoid coil 116' is contained within the solenoid housing 12', and the solenoid coil 116' is energized by a starter switch, not shown, which corresponds to the starter switch 112 of the embodiment of FIGS. 1 through 9. A steel contact plate 132' within the solenoid housing 12' is drawn toward the solenoid coil 116' by the magnetic attraction therefrom, thereby overcoming the biasing force of a spring 138' that normally acts to keep the steel contact plate 132' away from the solenoid coil 116'. The steel contact plate 132' is indirectly attached to a copper ring 135, an insulating ring 137 being provided therebetween. When the steel contact plate 132' is drawn toward the solenoid coil 116', as heretofore described, the copper ring 135 will make contact with a first terminal contact 128', which is connected to the battery carried by the vehicle and with a second terminal contact 130' which is connected to the field windings of the motor of the starter drive 100', thereby energizing the motor. When the starter switch is released from the "start" position, the solenoid coil 116' will be deenergized, thus, allowing the spring 138' to move the steel contact plate 132' away from the solenoid coil 116', breaking the contact between the first terminal contact 128' through the copper ring 135 to the second terminal contact 130' and deenergizing the motor of the starter drive 100'.

Although the best mode contemplated by the inventor for carrying out the present invention as of the filing date hereof has been shown and described herein, it will be apparent to those skilled in the art that suitable modifications, variations, and equivalents may be made without departing from the scope of the invention, such scope being limited solely by the terms of the following claims.

What is claimed is:

1. A starter drive for starting an internal combustion engine, said starter drive comprising:
- a starter housing having a first end and a second end;
- an electric motor positioned within said starter housing;
- a drive shaft that is connected to said electric motor to be driven thereby, said drive shaft carrying advancing starting means for advancing by the rotation of said drive shaft toward said second end of said starter drive into starting engagement with the internal combustion engine to be started; and
- solenoid means for selectively delivering electrical power to said electric motor, said solenoid means being mounted to said starter housing at said first end thereof, said solenoid means comprising:
  - a housing member;
  - a first terminal attached to said housing member, said first terminal being adapted to be connected to a source of electric power;
  - a second terminal attached to said housing member and being spaced apart from said first terminal, said second terminal being electrically connected to said electric motor;
  - a translatable annular armature positioned within said housing member and being translatable within said housing member between a first position and a second position;
  - biasing means normally biasing said translatable annular armature member toward one of said first position and said second position;
  - a solenoid coil positioned within said housing member, said solenoid coil being electrically connected to said first terminal and being adapted to be electrically energized when said first terminal is connected to said source of electric power, said solenoid coil, when electrically energized, creating an electromagnetic force that translates said translatable annular armature toward the other of said first position and said second position; and
  - contact means connected to said translatable annular armature and translatable therewith, said contact means electrically connecting siad first terminal and said second terminal to one another when said translatable annular armature has been translated toward said other of said first position and said second position, said first terminal and said second terminal being electrically disconnected from one another when said translatable annular armature is in said one of said first position and said second position.

2. A starter drive according to claim 1, wherein said biasing means comprises:
- a spring interposed said translatable annular armature and an end portion of said starter housing, said spring being adapted to bias said translatable annular armature in a direction from said end portion of said starter housing.

3. A starter drive according to claim 2, wherein said first terminal and said second terminal extend radially from said housing member of said solenoid means.

4. A starter drive according to claim 1, wherein said biasing means comprises:
- a spring interposed said translatable annular armature and a portion of said housing member of said solenoid means, said spring being adapted to bias said translatable annular armature in a direction from said portion of said housing member toward said starter housing.

5. A starter drive according to claim 4, wherein said first terminal and said second terminal extend longitudinally from said housing member of said starter housing.

6. An engine starter drive for engaging an engine ring gear to start an engine, said engine starter drive comprising:
- a motor;
- a motor housing having a first end and a second end;
- a drive shaft extending from said motor, said drive shaft having a first end portion drivingly interconnected with said motor and a second end portion extending from said motor away from said first end portion:
- advancing means formed on said drive shaft at a location intermediate said first and second end portions;
- a sleeve member mounted on said drive shaft, said sleeve member having one end, an other end opposite said one end, and an intermediate cylindrical portion extending from said one end to said other end, said intermediate cylindrical portion having an inner diameter and an outer diameter, said inner diameter being slidably and rotatably mounted on said advancing means on said drive shaft such that said sleeve member is axially advanced towards said second end portion of said drive shaft upon rotation of said drive shaft;
- a pinion gear slidably mounted on said second end portion of said drive shaft for axial movement along said drive shaft, said pinion gear further being adapted for movement into and out of engagement with said engine ring gear to start said engine;
- unidirectional clutch means coaxially disposed with said drive shaft and interposed said pinion gear and said sleeve member, said unidirectional clutch means further being slidably mounted on an intermediate portion of said sleeve member between said advancing means and said second end portion;
- housing engagement means connected to said sleeve member;
- means for interconnecting said motor housing and said housing engagement means when said pinion gear is advanced along said drive shaft by the rotation of said motor when activated so as to contact said engine ring gear such that said pinion gear is held in engagement with said engine ring gear and such that the total motor torque is transmitted to said engine ring gear until said motor is deactivated; and
- solenoid means for selectively delivering electrical power to said motor, said solenoid means being mounted to said motor housing at said first end thereof, said solenoid means comprising:
  - a housing member;
  - a first terminal attached to said housing member, said first terminal being adapted to be connected to a source of electric power;
  - a second terminal attached to said housing member and being spaced apart from said first terminal, said second terminal being electrically connected to said motor;

a translatable annular armature positioned within said housing member and being translatable within said housing member between a first position and a second position;

biasing means normally biasing said translatable annular armature member toward one of said first position and second position;

a solenoid coil positioned within said housing member, said solenoid coil being electrically connected within said first terminal and being adapted to be electrically energized when said first terminal is connected to said source of electric power, said solenoid coil, when electrically energized, creating an electromagnetic force that translates said translatable annular armature toward the other of said first position and said second position; and contact means connected to said translatable annular armature and translatable therewith, said contact means electrically connecting said first terminal and said second terminal to one another when said translatable annular armature has been translated toward said other of said first position and said second position, said first terminal and said second terminal being electrically disconnected from one another when said translatable annular armature is in said one of said first position and said second position.

7. An engine starter drive according to claim 6, wherein said biasing means comprises:

a spring interposed said translatable annular armature and an end portion of said motor housing, said spring being adapted to bias said translatable annular armature in a direction from said end portion of said motor housing.

8. An engine starter drive according to claim 7, wherein said first terminal and said second terminal extend radially from said housing member of said solenoid means.

9. An engine starter drive according to claim 6, wherein said biasing means comprises:

a spring interposed said translatable annular armature and a portion of said housing member of said solenoid means, said spring being adapted to bias said translatable annular armature in a direction from said portion of said housing member toward said motor housing.

10. A starter drive according to claim 9 wherein said first terminal and said second terminal extend longitudinally from said housing member of said motor housing.

* * * * *